United States Patent [19]

Allen

[11] Patent Number: 5,510,004
[45] Date of Patent: Apr. 23, 1996

[54] AZETIDINIUM POLYMERS FOR IMPROVING WET STRENGTH OF PAPER

[75] Inventor: Anthony J. Allen, Wilmington, Del.

[73] Assignee: Hercules Incorporated, Wilminton, Del.

[21] Appl. No.: 347,921

[22] Filed: Dec. 1, 1994

[51] Int. Cl.⁶ .................................................. D21H 21/20
[52] U.S. Cl. .................... 162/168.2; 162/135; 162/164.6
[58] Field of Search .............................. 162/168.2, 168.3, 162/135, 164.6; 526/263; 427/391, 392

[56] References Cited

U.S. PATENT DOCUMENTS

| | | | |
|---|---|---|---|
| 4,198,269 | 4/1980 | Evani et al. | 162/168.3 |
| 4,341,887 | 7/1982 | Buriks et al. | 526/263 |
| 5,350,796 | 9/1994 | Devore et al. | 162/168.3 |

*Primary Examiner*—Peter Chin
*Attorney, Agent, or Firm*—M. F. Sloan; M. D. Kuller

[57] ABSTRACT

The use of polymers and copolymers of N,N-diallyl-3-hydroxyazetidinium salts as agents for improving the wet strength of paper wherein the polymers have a reduced level of organohalide by-products. Also encompassed are paper furnishes and paper containing the polymers and copolymers.

70 Claims, No Drawings

AZETIDINIUM POLYMERS FOR IMPROVING WET STRENGTH OF PAPER

FIELD OF THE INVENTION

This invention relates to the use of polymers of N,N-diallyl-3-hydroxyazetidinium halides as agents for improving the wet strength of paper, wherein the polymers have a reduced level of organohalide by-products. It also relates to copolymers of N,N-diallyl-3-hydroxyazetidinium halides and their use in the manufacture of paper. It also encompasses paper furnishes and paper containing the polymers and copolymers.

BACKGROUND OF THE INVENTION

Papers used in a variety of applications, e.g. toweling and bags, require a high level of wet strength in order to maintain structural integrity under water-wet conditions. The use of resins, generally cationic resins, to improve the wet strength of paper is thoroughly discussed by H. H. Espy in "Pulp and Paper Manufacture, Third Edition", Volume 6, TAPPI, 1992, pages 65–83. This publication is incorporated herein in its entirety by reference.

Improving the wet strength of paper by use of cationic, water-soluble resins derived from reaction of epichlorohydrin with poly(diallylamine) is disclosed by Keim in U.S. Pat. Nos. 3,700,623 and 3,772,076, and by Van Eenam in U.S. Pat. Nos. 4,298,639 and 4,298,715, which four patents are incorporated herein by reference in their entirety.

The existence of azetidinium ions in wet strength resins prepared by reaction of epichlorohydrin with polyaminoamides, with polyalkyleneamines and with poly(diallylamine) is discussed by Espy in "Pulp and Paper Manufacture, Third Edition", Volume 6, TAPPI, 1992, pages 65–83, which is incorporated in its entirety by reference.

The epichlorohydrin-based wet strength resins referred to above are prepared by reaction of epichlorohydrin in aqueous solution with polymers containing secondary amino groups. Not all of the epichlorohydrin in the aqueous reaction mixture reacts with the amine groups to functionalize the polymer. Some of the epichlorohydrin remains unreacted, some reacts with water to form 3-chloropropane-1,2-diol, and some reacts with chloride ion to form dichloro-2-propanol, normally a mixture of 1,3-dichloro-2-propanol and 2,3-dichloro-1-propanol. The 2,3-dichloro-1-propanol is generally formed in very small amounts when compared to 1,3-dichloro-2-propanol. These organic chloride by-products are generally considered to be environmental pollutants, and increasing environmental concerns have created an interest in wet strength resins that have reduced levels of such by-products.

A drawback in the preparation of wet strength resins by reaction of epichlorohydrin with poly(diallylamine) is the concomitant formation of the epichlorohydrin by-products as indicated above. For example, the level of organochloride residues found in resins produced by the methods of U.S. Pat. Nos. 3,700,623 and 3,772,076 has been found to be about 8,000 ppm of unreacted epichlorohydrin, about 300,000 ppm of 1,3-dichloropropanol, about 99,000 ppm of 3-chloro- 1,2-propanediol and about 160 ppm of 2,3-dichloro-1-propanol, all based on the dry weight of the resin.

Copending U.S. patent application Ser. No. 096,388, filed Jul. 26, 1993 discloses a process for reducing the levels of 1,3-dichloro-2-propanol and 2,3-chloro-1-propanol in the manufacture of polyaminoamide-epichlorohydrin resins comprising, conducting epichlorohydrin-polyaminoamide reaction in a mixture of water and an immiscible solvent for the epichlorohydrin.

Bull et al., in European Patent Application Publication No. 0 510 987A, disclose a process for dehalogenating the nitrogen-free, non-polymeric by-products of epihalohydrin reactions using enzymes.

Ehrhardt et al., in European Patent Application Publication No. 0 508 203A, disclose a process for decreasing epihalohydrin monomeric by-products in reaction of epihalohydrins with polyalkylene polyamines comprising addition of the amine to the epihalohydrin at low temperature.

Bower, in European Patent Application Publication No. 0 488 767A, discloses a two-step process for reducing the level of undesirable epichlorohydrin by-products in the reaction of epichlorohydrin with polyamines comprising reacting the epichlorohydrin with a polyamine first at a temperature of 25°–40° C. and then heating the mixture at 25°–85° C.

Miller et al., in U.S. Pat. No. 5,171,795, disclose a process for carrying out the reaction of epichlorohydrin with polyaminoamides that reduces the level of epichlorohydrin by-products, comprising reacting the polyaminoamide with epichlorohydrin at a temperature of about 20°–60° C. until at least 70% of the total charge of epichlorohydrin has reacted. The polymer solution is then treated with a mineral acid at 20°–100° C. followed by continuation of the reaction at 20°–100° C. to isomerize N-chlorohydrin groups to 3-hydroxyazetidinium chloride groups.

Gorzynski, in PCT WO 92/22601, discloses a process for preparation of epihalohydrin-based resins having reduced halogen content using a treatment with a basic ion-exchanger.

Amey, in PCT WO 93/21384, discloses preparation of polyamide-epichlorohydrin resins having low levels of free epichlorohydrin and related hydrolysis products using an adsorbent selected from ion-exchange resins, non-ionic polymeric resins, synthetic carbonaceous adsorbents, activated carbon, zeolites, silica, clays and alumina.

Devore et al., in U.S. Pat. Nos. 5,189,142 and 5,239,047, disclose methods for preparing aminopolyamide-epichlorohydrin resins containing low levels of total organic chlorine by varying process conditions.

SUMMARY OF THE INVENTION

The present invention pertains to a process for increasing the wet strength of paper comprising adding to an aqueous pulp slurry an aqueous solution of N,N-diallyl-3-hydroxy azetidinium halide polymer wherein said aqueous polymer solution contains organic halide by-products comprised of 1,3-dihalo-2-propanol, 2,3-dihalo-1-propanol and 3-halo-1,2-propanediol at a level of less than about 10,000 ppm based on the dry weight of polymer. These polymers are preferably prepared by polymerization of monomer comprising N,N-diallyl-3-hydroxy azetidinium halides. The polymers may also be copolymers comprising units derived from at least one unsaturated comonomer.

The invention also pertains to the process for increasing the wet strength of paper comprising adding to an aqueous pulp slurry copolymers of N,N-diallyl-3-hydroxy azetidinium halides with unsaturated comonomers. The invention also encompasses the processes further comprising adding to the pulp slurry a polyfunctional amine.

In another embodiment, the present invention pertains to a paper making furnish comprising an aqueous pulp slurry and the polymers or copolymers of N,N-diallyl-3-hydroxy azetidinium halides.

The invention also pertains to paper made by a process comprising adding to the aqueous pulp slurry the polymers and copolymers of N,N-diallyl-3-hydroxy azetidinium halides.

DETAILED DESCRIPTION OF THE INVENTION

The general procedures for preparing N,N-diallyl-3-hydroxy azetidinium halides, in particular the chloride (II), and for their homopolymerization and copolymerization with acrylamide are disclosed by Buriks et al. in U.S. Pat. No. 4,341,887 (BURIKS '887), which is included herein by reference in its entirety. The scheme for preparing the monomer and polymer, illustrated for the chloride is:

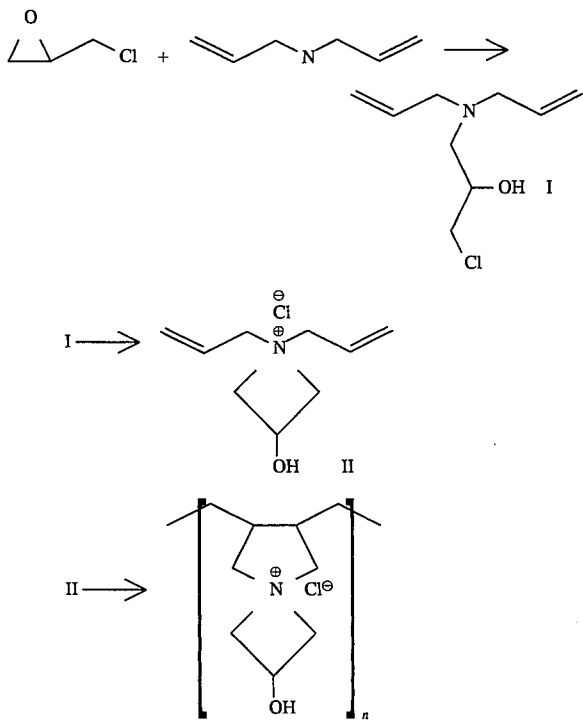

where n is from about 10 to about 5000.

Organohalide by-products which can form in reaction of epihalohydrins with diallylamine comprise at least one member selected from dihaloalkanols of the formulas $X-CH_2CH(OH)CH_2-X$ and $X-CH_2CH(X)CH_2-OH$, and haloalkanediols having the formula $HO-CH_2CH(OH)CH_2-X$, where X is halogen. In the case where the epihalohydrin is epichlorohydrin the dihaloalkanol comprises 1,3-dichloro-2-propanol and small amounts of 2,3-dichloro-1-propanol, and the haloalkanediol comprises 3-chloro-1,2-propanediol.

The halohydrin I can be purified by vacuum stripping or distillation to substantially reduce the level of organohalide by-products and unreacted epihalohydrin. Conversion of the halohydrin to N,N-diallyl-3-hydroxy azetidinium halide and then to polymer preserves the low level of organohalide by-products, and thus the polymers can be produced with a level of organohalide by-products, i.e. the total of 3-halopropane-1,2-diol, 1,3-dihalo-2-propanol, 2,3-dihalo-1-propanol and unreacted epihalohydrin, less than about 10,000 ppm based on the dry weight of the polymer in the aqueous polymer solution. Preferably the level of organohalide by-product in the aqueous polymer solution is reduced to a level of about 2,000 ppm, more preferably to a level of about 500 ppm, and most preferably to a level of about 100 ppm based on the dry weight of polymer. These levels of organohalide by-product are substantially lower than the levels found in wet strength resins prepared by reaction of poly(diallylamine) with epihalohydrins. The level of by-products might be further reduced using adsorption or other known techniques.

The process for increasing the wet strength of paper further comprises adding to aqueous pulp slurries copolymers of N,N-diallyl-3-hydroxy azetidinium halides and at least one unsaturated comonomer comprising a vinyl or allyl comonomer.

The unsaturated comonomers comprise at least one member selected from the group consisting of:

(a) $(R)_2C=C(R)_2$ where R, which can be the same or different, is hydrogen, alkyl, phenyl, carboxyl, alkyl carboxylate, hydroxyalkyl carboxylate, acyl, carboxamide, carbalkoxy, dimethylaminoalkyl carboxylate, sulfonate, $-HNC(R_1)O$, $-CONHC(CH_3)CH_2SO_3Na$, pyridinyl and

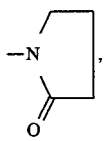

where $R_1$ is hydrogen or $C_1-C_{10}$ alkyl;

(b) $R_2N-(CH_2CH=CH_2)_2$ where $R_2$, which can be the same or different, is hydrogen or C1–C10 alkyl; and (c) $(R_2)_2^{\oplus}N-(CH_2CH=CH_2)_2^{\ominus}X$ where $R_2$, which can be the same or different, is hydrogen or C1–C10 alkyl and X is halogen.

Preferred comonomers are acrylamide, diallylamine, diallylamine hydrohalides, methyldiallylamine, methyldiallylamine hydrohalides, dimethyldiallylammonium halides, maleic acid, sodium vinylsulfonate, sodium acrylate, sodium methacrylate, N,N-dimethylaminoethylmethacrylate, dimethylaminoethylacrylate, sodium salt of 2-acrylamido-2-methyl- 1-propanesulfonic acid, N-vinyl-2-pyrrolidinone, N-vinylformamide, N-vinylacetamide, vinyl acetate, 2-vinylpyridine, 4-vinylpyridine, 4-styrenesulfonic acid, hydroxyethyl methacrylate, hydroxypropyl methacrylate, hydroxyethyl acrylate, hydroxypropyl acrylate, glycidyl acrylate and glycidyl methacrylate. The most preferred comonomer is N-vinyl-2-pyrrolidinone.

The preferred level of unsaturated comonomer present in the copolymers expressed as a mole fraction of N,N-diallyl-3-hydroxy azetidinium halide plus unsaturated comonomer is from about 10 to about 85 mole percent, more preferably about 30 to about 65 mole percent and most preferably about 45 to about 55 mole percent. For the case of copolymers of N,N-diallyl-3-hydroxy azetidinium chloride and N-vinyl-2-pyrrolidinone, the preferred mole ratio is about 50% N,N-diallyl- 3-hydroxy azetidinium chloride and about 50% N-vinyl- 2-pyrrolidinone.

The copolymers will also have the aforementioned low levels of by-products.

The reduced specific viscosity (RSV) of aqueous polymer and copolymer solutions used in this invention is a measure of polymer molecular weight. The RSV of aqueous polymer and copolymer solutions was measured at 25° C. in 1.0M $NH_4Cl$ using 0.5 wt. % polymer solutions. The RSV of polymers and copolymers suitable for operation in this invention can vary from about 0.1 to about 5.0 dL/g. Preferably the RSV is in the range of about 1.0 to about 5.0 dL/g. Most preferably it is in the range of about 1.5 to about 5.0 dL/g.

The polymers and copolymers of N,N-diallyl-3-hydroxy azetidinium halides are used in aqueous solution to increase the wet strength of paper. For reasons of convenience or economy the polymers and copolymers prepared by polymerization of N,N-diallyl-3-hydroxy azetidinium halides may be prepared at a total solids level of from about 25% to about 80%. More preferably the solids level is from about 40% to about 70%, and most preferably from about 45% to about 65%. The solids level can be reduced in use, if desired, by addition of an appropriate amount of water.

The process for preparing polymers and copolymers of N,N-diallyl-3-hydroxy azetidinium halides described in BURIKS '887 comprises free radical polymerization in aqueous solution. The polymers and copolymers of the present invention can also be prepared by inverse emulsion polymerization.

The polymers and copolymers of N,N-diallyl-3-hydroxy azetidinium halide, prepared as described herein, may be incorporated into the aqueous pulp slurry at any point on the wet end of the paper machine. They may also be applied after sheet formation at the size press. For most purposes adequate wet strength can be obtained by incorporating in the aqueous pulp from about 0.1 to about 5 wt. percent of the resin based on the dry weight of the pulp. Preferably the level is from about 0.2 wt. percent to about 3 wt. percent, and most preferably from about 0.2 to about 1.5 wt. percent.

In another embodiment of the invention it has been found that the performance of the polymers and copolymers of N,N-diallyl-3-hydroxy azetidinium halides as wet strength resins is enhanced by their use in conjunction with polyamines. Both monomeric polyamines, as well as polymeric polyamines are useful in this embodiment.

The monomeric polyamines which are preferred in the operation of this invention comprise members selected from the group consisting of $NH_2(CH_2)_nNH_2$, where n is an integer from 2 to 8, and $H_2NCH_2CH_2(NHCH_2CH_2)_nNH_2$, where n is an integer from 1 to 4. Representative polyamines of formula $NH_2(CH_2)_nNH_2$ comprise ethylenediamine, propylene diamine, tetramethylene diamine, pentamethylene diamine, hexamethylene diamine, heptamethylene diamine and octamethylene diamine. Representative polyamines of formula $H_2NCH_2CH_2(NHCH_2CH_2)_nNH_2$ comprise diethylene triamine, triethylene tetramine, and tetraethylene pentamine.

Representative polymeric polyamines which are useful in the operation of this invention comprise members selected from the group consisting of polyethyleneimine, polyvinylamine, polydiallylamine, poly(vinylamine-co-vinylalcohol) and polyaminoamides prepared by reaction of polyalkyene polyamines with aliphatic dicarboxylic acids. An example of the last is the polyaminoamide prepared by reaction of diethylene triamine with adipic acid.

When polyamines are used in the practice of this invention, they may be used at a level of from about 0.5 wt. percent to about 80 wt. percent on a dry basis based on the amount of polymer or copolymer of N,N-diallyl-3-hydroxy azetidinium halide. Preferably they are used at a level of from about 5 wt. percent to about 15 wt. percent, and more preferably from about 10 wt. percent to about 15 wt. percent on a dry basis.

A preferred combination is polyethyleneimine and a copolymer wherein the unsaturated comonomer is N-vinyl-2-pyrrolidinone at a level of about 45 to 55 mole percent, and wherein the ratio of copolymer to polyethyleneimine is from about 9/1 to about 19/1.

Addition of polyamines to solutions of polymers or copolymers of N,N-diallyl-3-hydroxy azetidinium halide as described herein can result in crosslinking leading to gelation. For this reason, when polyamine is used in conjunction with the polymers and copolymers it is preferred to first add the polymer or copolymer followed by drying of the sheet, and then to add the polyamine at the size press followed by another drying step. In another method of operation, the polyamine can be mixed with the polymer or copolymer of N,N-diallyl-3-hydroxy azetidinium halide. The resulting mixture may be stabilized, preferably with mineral acid, to a pH of about 5.0 or lower. The pH is then adjusted with base to the desired pH, preferably about 7.5, immediately prior to use of the material in the pulp slurry.

The invention is illustrated by the following Examples, which are provided for the purpose of representation, and are not to be construed as limiting the scope of the invention. All parts and percentages in the examples are by weight unless otherwise specified.

COMPARATIVE EXAMPLE

The reaction product of poly(diallylamine) with epichlorohydrin was carried out by the method described in U.S. Pat. No. 3,772,076.

To a heated reaction vessel equipped with a reflux condenser, stirrer, thermocouple and pH probe, was added 34.2 parts of poly(diallylamine) (42.2% solids in water) and 200 parts of deionized water. After adjusting the pH to 8.5 with 1N NaOH, 14.8 parts of epichlorohydrin was added. The mixture was heated to 50° C., held for 30 minutes, and then 300 part of deionized water was added. The pH of the product was then adjusted to 5.0 with 3N HCl. The solids level of the product was 5.33%.

Epichlorohydrin residuals were analyzed by gas chromatography in duplicate. The values (duplicate measurements) in ppm based on dry weight of product were: epichlorohydrin 8,818 and 8,236; 1,3-dichloropropanol 301,669 and 307,355; 3-chloro-1,2-propanediol 93,564 and 104,240; 2,3-dichloro-1-propanol 150 and 169.

EXAMPLE 1

This example describes the preparation of N,N-diallylamino- 3-chloropropan-2-ol.

To 210 parts of diallylamine and 200 parts of absolute ethanol in a stirred vessel under nitrogen was added dropwise 200 parts of epichlorohydrin over a period of 40 minutes while the temperature was maintained below 40° C. The reaction was maintained below 40° C. overnight, and then the solvent was removed under vacuum to give 355 parts of product. Analysis of the product by gas chromatography indicated a composition of 89.5% N,N-diallylamino-3-chloropropan-2-ol and 7.2% bis(1,3-N,N-diallylamino)-2-propanol.

EXAMPLE 2

This example describes the synthesis of N,N-diallyl-3-hydroxyazetidinium chloride.

A mixture of 15 parts of N,N-diallylamino-3-chloropropan-2-ol prepared as in Example 1 and 15 parts of deionized water was heated to 80° C. for 1 hour. The NMR spectrum of the resulting solution indicated essentially quantitative conversion to N,N-diallyl-3-hydroxyazetidinium chloride, which was present at 50% solids.

EXAMPLE 3

This example describes the preparation of the homopolymer of N,N-diallyl-3-hydroxyazetidinium chloride.

A solution of 28.45 parts of the aminochlorohydrin of Example 1 and 28.45 parts of deionized water was heated to 80° C. for 1 hour with stirring. After the solution was cooled to room temperature, 0.0185 parts of ethylenediamine tetraacetic acid (EDTA) was added and the resulting solution was sparged with nitrogen. The reaction mixture was heated to 80° C., and then a nitrogen-sparged solution of 0.5 parts of azobis(isobutyramidine) dihydrochloride (ABIBA) in 35 parts of water was added at a rate of 10 ml/hour. The addition of ABIBA was complete after 3.1 hours. At this point proton NMR analysis indicated a monomer conversion of 71%. After heating for an additional 2.5 hours, the monomer conversion was 74%.

The product had 25.3% solids and a reduced specific viscosity of 1.014 dL/g.

EXAMPLE 4

This example describes the preparation of a copolymer of N,N-diallyl-3-hydroxyazetidinium chloride and acrylamide.

A mixture of 25 parts of the aminochlorohydrin prepared as in Example 1 and 37.5 parts of water was heated for 1 hour to convert the aminochlorohydrin to the diallylazetidinium chloride monomer. After the solution was cooled to room temperature 0.007 parts of EDTA tetrasodium salt was added, and then the pH was adjusted to 6.0 with 10% sulfuric acid.

The entries in Table 1 describe the polymers and copolymers of N,N-diallyl-3-hydroxyazetidinium chloride prepared using the procedures of Examples 1–4. The feed monomer and product composition data in the Table are mole percents.

TABLE 1

POLYMERS AND COPOLYMERS OF DIALLYLAZETIDINIUM CHLORIDE

| POLYMER | Mole Percent FEED MONOMERS | PRODUCT COMPOSITION, Mole Percent | RSV | PPM[1] 1,3-DCP | PPM[1] 3-CPD |
|---|---|---|---|---|---|
| A | 100% DAAZ | 100% DAAZ | 0.372 | | |
| B | 100% DAAZ | 100% DAAZ | 1.48 | 7,633 | 164 |
| C | 27% DAAZ | 15% DAAZ | | | |
|   | 73% Acrylamide | 85% Acrylamide | 2.08 | | |
| D | 88% DAAZ | 57% DAAZ | | | |
|   | 12% Acrylamide | 43% Acrylamide | 0.358 | | |
| E | 90% DAAZ | 89% DAAZ | | | |
|   | 10% Diallylamine | 11% Diallylamine | 0.157 | | |
| F | 80% DAAZ | 79% DAAZ | | | |
|   | 20% Diallylamine | 21% Diallylamine | 0.208 | | |
| G | 85% DAAZ | 75% DAAZ | | | |
|   | 15% Diallylamine | 25% Diallylamine | 0.445 | | |
| H | 100% DAAZ | 100% DAAZ | 0.714 | | |
| I | 50% DAAZ | 50% DAAZ | | | |
|   | 50% NVF | 50% NVF | 1.48 | 56 | 24 |
| J | 50% DAAZ | 53% DAAZ | | | |
|   | 50% NVP | 47% NVP | 1.39 | 191 | 64 |
| K | 50% DAAZ | Not determined | | | |
|   | 50% AMPS | | 0.87 | | |
| L | 50% DAAZ | Not determined | | | |
|   | 50% DADMAC | | 0.77 | | |
| M | 100% DAAZ | 100% DAAZ | | 290 | 258 |

DAAZ = N,N-Diallyl-3-hydroxyazetidinium chloride
NVF = N-Vinylformamide
NVP = N-Vinyl-2-pyrrolidinone
AMPS = Sodium salt of 2-acrylamido-2-methyl-1-propanesulfonic acid
DADMAC = Diallyldimethylammonium chloride
RSV = Reduced specific viscosity, dL/g
*Number average molecular weight determined by aqueous size exclusion chromatography = 36,700
1. Based on dry polymer solids. 1,3-DCP = 1,3-dichloropropan-2-ol; 3-CPD = 3-chloro-1,2-propanediol.

TEST PROCEDURES

Polymer Solution Solids Level

The procedure for determining the solids level of the aqueous polymer solutions used consisted of heating a weighed sample in a vacuum oven at 80° C. for 3 hours, followed by determining the weight of the dry residue.

Reduced Specific viscosity

Reduced specific viscosities were measured at 25° C. in 1.0M ammonium chloride solution using 0.5 wt. % polymer solutions. A Lauda automatic viscometer was used to measure solution flow times.

Paper Treatment

Polymer solutions were applied to waterleaf paper using a size press. The waterleaf paper was manufactured from either 30:70 softwood:hardwood pulp or from 50:50 softwood:hardwood pulp, 40 basis weight, no alum, pH 7.9. All polymer samples were adjusted to pH 7.0–7.5 before application. Immediately following the size press application, the samples were drum dried at 104°–105° C. for 90 seconds.

When polyamines were used in conjunction with the polymers and/or copolymers, generally they were added at the size press in a subsequent step following the addition and drying steps for the polymers and/or copolymers. In Table 3 (below) the examples were carried out in this way except where indicated.

Paper Testing

Mechanical testing of paper samples was performed using TAPPI standard T494 as a guide. Basis weight, dry tensile strength and permanent wet tensile strength (2 hour soak) were measured for 1 inch wide samples. Temporary wet tensile strength was measured on selected samples. Permanent wet tensile was measured after the sample was soaked in deionized water for 2 hours. Temporary wet tensile was measured by brushing the paper sample with deionized water while it was held in the tensile tester, and then performing the tensile test after a 10 second delay. In handsheet testing, a 6 inch span sample was used at a rate of 2 inches/minute for dry strength measurement and 3 inches/minute for wet tensile measurement. With size pressed sheets, the span was 4 inches, and both wet and dry tensiles were measured at a rate of 2 inches/minute. All tensile data are normalized to a 40 lb/ream basis weight.

TABLE 2

TENSILE PROPERTIES OF PAPER TREATED WITH POLYMERS AND COPOLYMERS OF N,N-DIALLYL-3-HYDROXYAZETIDINIUM CHLORIDE

| EX'PL NO. | ADDED POLYMER | TENSILE PROPERTIES, UNCURED PAPER (LB/IN) | | | | | TENSILE PROPERTIES, AFTER CURING 30 MIN. AT 80° C. (LB/IN) | | | | |
|---|---|---|---|---|---|---|---|---|---|---|---|
| | | DRY | TEMP WET | TEMP W/D | PERM WET | PERM W/D | DRY | TEMP WET | TEMP W/D | PERM WET | PERM W/D |
| 5 | None | 21.8 | 0.98 | 4% | 0.64 | 3% | 20.7 | 0.98 | 5% | 0.65 | 3% |
| 6 | Kymene ® 557H, 0.5% | 23.0 | 4.79 | 21% | 3.80 | 17% | 23.8 | 5.86 | 25% | 4.67 | 20% |
| 7 | Kymene 557H, 1.0% | 23.1 | 4.95 | 21% | 4.45 | 19% | 25.3 | 6.95 | 27% | 5.07 | 20% |
| 8 | Kymene 557H, 2.0% | 22.3 | 7.77 | 35% | 5.90 | 26% | 25.0 | 9.32 | 37% | 6.82 | 27% |
| 9 | B, 0.5% | 22.8 | 2.70 | 12% | 1.80 | 8% | 22.5 | 3.54 | 16% | 2.19 | 10% |
| 10 | B, 1.0% | 21.8 | 3.38 | 15% | 2.10 | 10% | 23.8 | 4.15 | 19% | 2.74 | 12% |
| 11 | B, 2.0% | 23.1 | 4.12 | 18% | 2.52 | 11% | 22.8 | 5.40 | 23% | 3.36 | 14% |
| 12 | A, 0.5% | 22.0 | 1.67 | 8% | 1.25 | 6% | 24.0 | 2.37 | 12% | 1.94 | 10% |
| 13 | A, 1.0% | 22.0 | 1.99 | 9% | 1.48 | 7% | 23.6 | 2.66 | 14% | 2.25 | 12% |
| 14 | A, 2.0% | 21.8 | 2.16 | 10% | 1.60 | 7% | 23.5 | 3.27 | 18% | 2.49 | 14% |
| 15 | C, 0.5% | 23.4 | 2.30 | 10% | 1.79 | 8% | 23.5 | 2.53 | 11% | 2.09 | 9% |
| 16 | C, 1.0% | 23.6 | 2.67 | 11% | 2.11 | 9% | 25.2 | 3.16 | 13% | 2.54 | 10% |
| 17 | C, 2.0% | 25.8 | 3.72 | 14% | 2.63 | 10% | 25.8 | 3.95 | 15% | 3.05 | 12% |
| 18 | D, 0.5% | 19.1 | 1.73 | 9% | 1.28 | 7% | 20.4 | 2.31 | 11% | 1.74 | 9% |
| 19 | D, 1.0S | 19.9 | 1.89 | 9% | 1.38 | 7% | 19.8 | 2.74 | 14% | 2.03 | 10% |
| 20 | D, 2.0% | 19.3 | 2.17 | 11% | 1.48 | 8% | 19.3 | 2.99 | 15% | 2.20 | 11% |
| 21 | E, 0.5% | 20.1 | 2.01 | 10% | 1.44 | 7% | 20.9 | 2.43 | 12% | 1.73 | 8% |
| 22 | E, 1.0% | 20.2 | 1.95 | 10% | 1.40 | 7% | 20.5 | 2.53 | 12% | 1.75 | 9% |
| 23 | E, 2.0% | 19.8 | 1.96 | 10% | 1.38 | 7% | 19.2 | 2.50 | 13% | 1.82 | 9% |
| 24 | F, 0.5% | 18.7 | 1.87 | 10% | 1.25 | 7% | 19.3 | 2.26 | 12% | 1.60 | 8% |
| 25 | F, 1.0% | 19.4 | 1.93 | 10% | 1.38 | 7% | 18.9 | 2.58 | 14% | 1.93 | 10% |
| 26 | F, 2.0% | 18.6 | 1.96 | 11% | 1.55 | 8% | 19.2 | 2.74 | 14% | 2.15 | 11% |
| 27 | G, 0.5% | 19.7 | 1.58 | 8% | 1.35 | 7% | 21.8 | 1.70 | 8% | 1.57 | 7% |
| 28 | G, 1.0% | 19.7 | 1.70 | 9% | 1.42 | 7% | 21.6 | 2.02 | 9% | 1.72 | 8% |
| 29 | G, 2.0% | 20.4 | 2.10 | 10% | 1.60 | 8% | 20.2 | 2.53 | 12% | 2.14 | 11% |
| 30 | I, 0.5% | 18.3 | 2.48 | 14% | 1.73 | 9% | 18.7 | 2.92 | 16% | 2.32 | 12% |
| 31 | I, 1.0% | 20.1 | 3.38 | 17% | 2.25 | 11% | 20.7 | 4.28 | 21% | 3.01 | 15% |
| 32 | I, 2.0% | 21.6 | 4.16 | 19% | 2.90 | 13% | 22.5 | 5.14 | 23% | 3.42 | 15% |
| 33 | J, 1.0% | 21.4 | 5.69 | 27% | 3.69 | 17% | 22.9 | 7.83 | 34% | 4.17 | 18% |
| 34 | K, 1.0% | 18.2 | 1.91 | 10% | 1.33 | 7% | 18.0 | 2.30 | 13% | 1.81 | 10% |
| 35 | K, 2.0% | 19.6 | 2.23 | 11% | 1.66 | 8% | 19.5 | 3.09 | 16% | 2.36 | 12% |
| 36 | L, 1.0% | 16.3 | 1.81 | 11% | 1.32 | 8% | 18.8 | 2.64 | 15% | 1.79 | 10% |
| 37 | L, 2.0% | 17.4 | 2.62 | 15% | 1.73 | 10% | 18.1 | 3.11 | 17% | 2.10 | 12% |
| 38 | None | 15.7 | 0.96 | 6% | 1.62 | 10% | 17.5 | 0.87 | 5% | 0.50 | 3% |
| 39 | Kymene 557H, 1.0% | 20.9 | 6.11 | 294 | 4.25 | 20% | 20.4 | 6.30 | 31% | 4.10 | 23% |

Examples 5–29 utilize 30/70 softwood/hardwood waterleaf paper. Examples 30–39 utilize 50/50 softwood/hardwood waterleaf paper.
Polymer addition level expressed on dry basis as a weight percent of dry pulp
Kymene ® 557H wet strength agent resin is a product of Hercules Incorporated, Wilmington, Delaware
"Temp Wet" and Perm Wet" are temporary wet strength and permanent wet strength respectively.
"Temp W/D" and "Perm W/D" are temporary and permanent wet strength expressed as a percentage of the dry strength.

TABLE 3

TENSILE PROPERTIES OF PAPER TREATED WITH
POLYMERS OF N,N-DIALLYL-3-HYDROXYAZETIDINIUM CHLORIDE

| | | | TENSILE PROPERTIES, UNCURED PAPER (LB/IN) | | | | | TENSILE PROPERTIES, AFTER CURING 30 MIN. AT 80° C. (LB/IN) | | | | |
|---|---|---|---|---|---|---|---|---|---|---|---|---|
| EXAMPLE NO. | ADDED POLYMER | AMINE ADDITIVE | DRY | TEMP WET | TEMP W/D | PERM WET | PERM W/D | TEMP DRY | TEMP WET | PERM W/D | PERM WET | PERM W/D |
| 40 | None | None | 21.8 | 0.98 | 4% | 0.64 | 3% | 22.1 | 0.98 | 4% | 0.65 | 3% |
| 41 | Kymene 557H, 0.5% | None | 23.0 | 4.79 | 21% | 3.80 | 17% | 23.8 | 5.86 | 25% | 4.67 | 20% |
| 42 | Kymene 557H, 1.0% | None | 23.1 | 4.95 | 21% | 4.45 | 19% | 25.3 | 6.95 | 27% | 5.07 | 20% |
| 43 | Kymene 557H, 2.0% | None | 22.3 | 7.77 | 35% | 5.90 | 26% | 25.0 | 9.32 | 37% | 6.82 | 27% |
| 44 | H, 0.5% | None | 21.7 | 2.41 | 11% | 1.87 | 9% | 23.3 | 3.65 | 16% | 2.65 | 11% |
| 45 | H, 1.0% | None | 21.1 | 2.84 | 13% | 2.13 | 10% | 22.4 | 4.49 | 20% | 3.17 | 14% |
| 46 | H, 2.0% | None | 20.9 | 3.55 | 17% | 2.82 | 13% | 22.6 | 5.81 | 26% | 4.30 | 19% |
| 47 | H, 0.4% | HDA, 0.1% | 21.0 | 3.30 | 16% | 2.44 | 12% | 21.4 | 3.97 | 19% | 2.80 | 13% |
| 48 | H, 0.8% | HDA, 0.2% | 21.2 | 4.02 | 19% | 3.15 | 15% | 22.3 | 5.20 | 23% | 3.61 | 16% |
| 49 | H, 1.6% | RDA, 0.4% | 21.6 | 4.71 | 22% | 3.89 | 18% | 22.0 | 5.11 | 23% | 4.13 | 19% |
| 50 | H, 0.45% | HDA, 0.05% | 20.5 | 2.72 | 13% | 2.62 | 13% | 22.2 | 4.02 | 18% | 3.14 | 14% |
| 51 | H, 0.90% | HDA, 0.10% | 21.1 | 3.72 | 18% | 2.98 | 14% | 20.9 | 4.43 | 21% | 3.53 | 17% |
| 52 | H, 1.80% | HDA, 0.20% | 21.5 | 4.70 | 22% | 3.50 | 16% | 22.3 | 5.59 | 25% | 4.31 | 19% |
| 53 | H, 0.4% | DETA, 0.1% | 20.8 | 3.65 | 18% | 2.69 | 13% | 21.7 | 4.01 | 18% | 3.27 | 15% |
| 54 | R, 1.6% | DETA, 0.4% | 21.7 | 4.80 | 22% | 4.19 | 19% | 23.2 | 5.74 | 25% | 4.52 | 20% |
| 55 | H, 0.45% | DETA, 0.05% | 21.2 | 3.13 | 15% | 2.55 | 12% | 22.2 | 3.99 | 18% | 3.07 | 14% |
| 56 | H, 0.4% | PEI, 0.1% | 21.1 | 3.85 | 18% | 3.06 | 14% | 22.5 | 4.71 | 21% | 3.44 | 15% |
| 57 | H, 1.6% | PEI, 0.4% | 21.9 | 6.23 | 28% | 4.34 | 20% | 23.7 | 6.74 | 28% | 4.87 | 21% |
| 58 | H, 0.45% | PEI, 0.05% | 20.9 | 3.15 | 15% | 2.31 | 11% | 21.5 | 4.20 | 20% | 2.65 | 12% |
| 59 | H, 0.4% | PVAM, 0.1% | 22.2 | 3.94 | 18% | 3.26 | 15% | 22.4 | 4.37 | 19% | 4.45 | 20% |
| 60 | H, 1.6% | PVAM, 0.4% | 22.8 | 6.72 | 29% | 5.25 | 23% | 24.1 | 7.49 | 31% | 5.99 | 25% |
| 71 | H, 0.45% | PVAM, 0.05% | 20.9 | 3.27 | 16% | 2.70 | 13% | 23.6 | 3.98 | 17% | 3.02 | 13% |
| 72 | J, 1.0% | PEI, 0.014% | 19.4 | 2.88 | 15% | 2.49 | 13% | 21.0 | 3.74 | 18% | 3.21 | 15% |
| 73 | J, 1.0% | PEI, 0.028% | 20.7 | 3.38 | 16% | 2.87 | 14% | 19.7 | 4.02 | 20% | 3.30 | 17% |
| 74 | J, 1.0% | PEI, 0.056% | 17.7 | 3.37 | 19% | 2.63 | 15% | 22.2 | 4.36 | 20% | 3.67 | 16% |
| 75 | J, 1.0% | PEI, 0.084% | 18.6 | 3.65 | 20% | 2.87 | 15% | 21.7 | 4.17 | 19% | 3.50 | 16% |
| 76 | J, 1.0% | PVAM, 0.014% | 19.0 | 3.64 | 19% | 2.49 | 13% | 20.2 | 4.24 | 21% | 3.04 | 15% |
| 77 | J, 1.0% | PVAM, 0.028% | 20.5 | 4.27 | 21% | 2.73 | 13% | 21.7 | 5.56 | 26% | 3.30 | 15% |
| 78 | J, 1.0% | PVAM, 0.056% | 19.4 | 4.18 | 22% | 2.63 | 14% | 20.2 | 4.23 | 21% | 3.14 | 16% |
| 79 | J, 1.0% | PVAM, 0.084% | 22.1 | 4.63 | 21% | 2.78 | 13% | 22.7 | 5.47 | 24% | 3.38 | 15% |

Example, 40–71 utilize, 30/70 softwood/hardwood waterleaf paper. Examples 72–79 utilize 50/50 softwood/hardwood waterleaf paper.
Polymer addition level expressed on dry basis as a weight percent of dry pulp
Amine addition level expressed on a dry basis as a weight percent of dry polymer solids.
Kymene 557H is a commercial wet strength agent resin, a product of Hercules Incorporated
"Temp Wet" and Perm Wet" are temporary wet strength and permanent wet strength respectively.
"Temp W/D" and "Perm W/D" are temporary and permanent wet strength expressed as a percentage of the dry strength.
In Examples 72–79 the copolymer solution was mixed with the polyamine and the resulting mixture was stabilized at pH <5.0. Before application at the size press the pH was adjusted to about 7.5.
HDA = hexamethylenediamine;
DETA = diethylenetriamine;
PEI = polyethyleneimine;
PVAM = polyvinylamine, molecular weight 100,000
PEI = polyethyleneimine, molecular weight 50,000–60,000

What is claimed is:

1. A process for making paper with increased wet strength comprising:
   (a) providing an aqueous pulp slurry;
   (b) forming the aqueous pulp slurry into a sheet; and
   (c) drying the sheet;
   wherein there is added to the aqueous pulp slurry or to the sheet at a size press, or both, an aqueous solution of a polymer or copolymer of N,N-diallyl-3-hydroxy azetidinium halide wherein at least 15 mole percent of the monomer units present in the copolymer are derived from N,N-diallyl-3-hydroxy azetidinium halide;
   wherein said polymer or copolymer is added at a level of at least about 0.1% on a dry basis based on the dry weight of the pulp; and
   wherein said aqueous polymer or copolymer solution contains organic halide by-products comprised of 1,3-dihalo-2-propanol, 2,3-dihalo-1-propanol and 3-halo-1,2-propanediol at a level of less than about 10,000 ppm based on the dry weight of polymer.

2. The process of claim 1 wherein the polymer consists essentially of units derived from N,N-diallyl-3-hydroxy azetidinium chloride.

3. The process of claim 1 wherein the organic halide by-products comprise 1,3-dichloro-2-propanol, 2,3-dichloro-1-propanol and 3-chloro-1,2-propanediol.

4. The process of claim 1 wherein the amount of organic halide by-products in the aqueous polymer or copolymer solution is less than about 2,000 ppm on a dry basis.

5. The process of claim 1 wherein the amount of organic halide by-products in the aqueous polymer or copolymer solution is less than about 500 ppm on a dry basis.

6. The process of claim 1 wherein the amount of organic halide by-products in the aqueous polymer or copolymer solution is less than about 100 ppm on a dry basis.

7. The process of claim 1 wherein the polymer is a copolymer of N,N-diallyl-3-hydroxy azetidinium halide comprising units derived from at least one unsaturated comonomer.

8. The process of claim 7 wherein the unsaturated comonomer comprises a vinyl or a diallyl comonomer.

9. The process of claim 8 wherein the unsaturated comonomer comprises at least one member selected from the group consisting of:

(a) $(R)_2C=C(R)_2$ where R, which can be the same or different, is hydrogen, alkyl, phenyl, carboxyl, alkyl carboxylate, hydroxyalkyl carboxylate, acyl, carboxamide, carbalkoxy, dimethylaminoalkyl carboxylate, sulfonate, $-HNC(R_1)O$, $-CONHC(CH_3)CH_2SO_3Na$, pyridinyl and

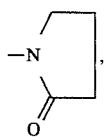

where $R_1$ is hydrogen or $C_1-C_{10}$ alkyl;

(b) $R_2N-(CH_2CH=CH_2)_2$ where $R_2$, which can be the same or different, is hydrogen or C1–C10 alkyl; and (c) $(R_2)_2^\oplus N-(CH_2CH=CH_2)_2^\ominus X$ where $R_2$, which can be the same or different, is hydrogen or C1–C10 alkyl and X is halogen.

10. The process of claim 9 wherein the unsaturated comonomer is selected from the group consisting of acrylamide, diallylamine, diallylamine hydrohalides, methyldiallylamine, methyldiallylamine hydrohalides, dimethyldiallylammonium halides, maleic acid, sodium vinylsulfonate, sodium acrylate, sodium methacrylate, N,N-dimethylaminoethylmethacrylate, dimethylaminoethylacrylate, sodium salt of 2-acrylamido-2-methyl-1-propanesulfonic acid, N-vinyl-2-pyrrolidinone, N-vinylformamide, N-vinylacetamide, vinyl acetate, 2-vinylpyridine, 4-vinylpyridine, 4-styrenesulfonic acid, hydroxyethyl methacrylate, hydroxypropyl methacrylate, hydroxyethyl acrylate, hydroxypropyl acrylate, glycidyl acrylate and glycidyl methacrylate.

11. The process of claim 10 wherein the unsaturated comonomer comprises N-vinyl-2-pyrrolidinone.

12. The process of claim 7 wherein unsaturated comonomer units are present at a level of from about 10 to about 85 mole percent of the total monomer units.

13. The process of claim 12 wherein unsaturated comonomer units are present at a level of from about 30 to about 65 mole percent of the total monomer units.

14. The process of claim 13 wherein unsaturated comonomer units are present at a level of from about 45 to about 55 mole percent of the total monomer units.

15. The process of claim 1 wherein the polymer or copolymer is added to the aqueous pulp slurry or to the sheet at the size press at a level of from about 0.1 to about 5 wt. percent based on the dry weight of the pulp.

16. The process of claim 15 wherein the polymer or copolymer is added to the aqueous pulp slurry or to the sheet at the size press at a level of from about 0.2 to about 3 wt. percent based on the dry weight of the pulp.

17. The process of claim 16 wherein the polymer or copolymer is added to the aqueous pulp slurry or to the sheet at the size press at a level of from about 0.2 to about 1.5 wt. percent based on the dry weight of the pulp.

18. The process of claim 1 further comprising adding to the aqueous pulp slurry or to the sheet at the size press a polyfunctional amine.

19. The process of claim 7 further comprising adding to the aqueous pulp slurry or to the sheet at the size press a polyfunctional amine.

20. The process of claim 18 wherein the polyfunctional amine comprises a monomeric polyamine.

21. The process of claim 20 wherein the monomeric polyamine comprises at least one member selected from the group consisting of $NH_2(CH_2)_nNH_2$, where n is an integer from 2 to 8, and $H_2NCH_2CH_2(NHCH_2CH_2)_nNH_2$, where n is an integer from 1 to 4.

22. The process of claim 21 wherein the monomeric polyamine is selected from the group consisting of ethylenediamine, propylene diamine, tetramethylene diamine, pentamethylene diamine, hexamethylene diamine, diethylene triamine, triethylene tetramine, and tetraethylene pentamine.

23. The process of claim 18 wherein the polyfunctional amine comprises a polymeric polyfunctional amine.

24. The process of claim 23 wherein the polymeric polyfunctional amine comprises at least one member selected from the group consisting of polyethyleneimine, polyvinylamine, polydiallylamine, poly(vinylamine-co-vinylalcohol) and polyaminoamides prepared by reaction of polyalkyene polyamines with aliphatic dicarboxylic acids.

25. The process of claim 18 wherein the polyfunctional amine is added to the aqueous pulp slurry or to the sheet at the size press at a level of from about 0.5 to about 80 wt. percent based on the dry weight of the polymer.

26. The process of claim 25 wherein the polyfunctional amine is added to the aqueous pulp slurry or to the sheet at the size press at a level of from about 5 to about 15 wt. percent based on the dry weight of the polymer.

27. The process of claim 26 wherein the polyfunctional amine is added to the aqueous pulp slurry or to the sheet at the size press at a level of from about 10 to about 15 wt. percent based on the dry weight of the polymer.

28. The process of claim 25 wherein the polymer or copolymer is added to the aqueous pulp solution or to the sheet at the size press at a level of from about 0.1 to about 5 wt. percent based on the dry weight of the pulp.

29. The process of claim 19 wherein the unsaturated comonomer comprises N-vinyl-2-pyrrolidinone and the polyfunctional amine comprises polyethyleneimine.

30. The process of claim 18 wherein the polyfunctional amine is added to the sheet at the size press.

31. The process of claim 1 wherein the polymer or copolymer is added to the sheet at the size press.

32. A process for making paper with increased wet strength comprising:

(a) providing an aqueous pulp slurry;

(b) forming the aqueous pulp slurry into a sheet; and (c) drying the sheet;

wherein there is added to the aqueous pulp slurry or to the sheet at a size press, or both, an aqueous solution of a polymer prepared by polymerizing monomer consisting essentially of N,N-diallyl-3-hydroxy azetidinium halide; and wherein said polymer is added at a level of at least about 0.1% on a dry basis based on the dry Weight of the pulp.

33. The process of claim 32 further comprising adding to the aqueous pulp slurry or to the sheet at the size press a polyfunctional amine.

34. A process for making paper with increased wet strength comprising:

(a) providing an aqueous pulp slurry;

(b) forming the aqueous pulp slurry into a sheet; and (c) drying the sheet;

wherein there is added to the aqueous pulp slurry or to the sheet at a size press, or both, an aqueous solution of a copolymer of N,N-diallyl-3-hydroxy azetidinium halide and at least one unsaturated comonomer, wherein at least 15 mole percent of the monomer units present in the copolymer are derived from N,N-diallyl-3-hydroxy azetidinium halide; and wherein said copolymer is added at a level of at least about 0.1% on a dry basis based on the dry weight of the pulp.

35. The process of claim 34 wherein the unsaturated comonomer is a vinyl or a diallyl comonomer.

36. The process of claim 35 wherein the unsaturated comonomer comprises at least one member selected from the group consisting of:

(a) $(R)_2C=C(R)_2$ where R, which can be the same or different, is hydrogen, alkyl, phenyl, carboxyl, alkyl carboxylate, hydroxyalkyl carboxylate, acyl, carboxamide, carbalkoxy, dimethylaminoalkyl carboxylate, sulfonate, —HNC($R_1$)O, —CONHC($CH_3$)$CH_2SO_3Na$, pyridinyl and

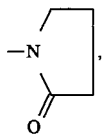

where $R_1$ is hydrogen or $C_1$–$C_{10}$ alkyl;

(b) $R_2N$—$(CH_2CH=CH_2)_2$ where $R_2$, which can be the same or different, is hydrogen or C1–C10 alkyl; and (c) $(R_2)_2{}^{\oplus}N$—$(CH_2CH=CH_2)_2{}^{\ominus}X$ where $R_2$, which can be the same or different, is hydrogen or C1–C10 alkyl and X is halogen.

37. The process of claim 36 wherein the unsaturated comonomer is selected from the group consisting of acrylamide, diallylamine, diallylamine hydrohalides, methyldiallylamine, methyldiallylamine hydrohalides, dimethyldiallylammonium halides, maleic acid, sodium vinylsulfonate, sodium acrylate, sodium methacrylate, N,N-dimethylaminoethylmethacrylate, dimethylaminoethylacrylate, sodium salt of 2-acrylamido-2-methyl-1-propanesulfonic acid, N-vinyl-2-pyrrolidinone, N-vinylformamide, N-vinylacetamide, vinyl acetate, 2-vinylpyridine, 4-vinylpyridine, 4-styrenesulfonic acid, hydroxyethyl methacrylate, hydroxypropyl methacrylate, hydroxyethyl acrylate, hydroxypropyl acrylate, glycidyl acrylate and glycidyl methacrylate.

38. The process of claim 37 wherein the unsaturated comonomer comprises N-vinyl-2-pyrrolidinone.

39. The process of claim 34 wherein unsaturated comonomer units are present in the N,N-diallyl- 3-hydroxy azetidinium halide copolymer at a level of from about 10 to about 85 mole percent of total monomer units.

40. The process of claim 34 wherein unsaturated comonomer units are present in the N,N-diallyl- 3-hydroxy azetidinium halide copolymer at a level of from about 30 to about 65 mole percent of total monomer units.

41. The process of claim 34 wherein unsaturated comonomer units are present in the N,N-diallyl- 3-hydroxy azetidinium halide copolymer at a level of from about 45 to about 55 mole percent of total monomer units.

42. The process of claim 34 wherein the copolymer is added to the aqueous pulp slurry or to the sheet at the size press at a level of from about 0.1 to about 5 wt. percent based on the dry weight of the pulp.

43. The process of claim 42 wherein the copolymer is added to the aqueous pulp slurry or to the sheet at the size press at a level of from about 0.2 to about 3 wt. percent based on the dry weight of the pulp.

44. The process of claim 43 wherein the copolymer is added to the aqueous pulp slurry or to the sheet at the size press at a level of from about 0.2 to about 1.5 wt. percent based on the dry weight of the pulp.

45. The process of claim 34 further comprising adding to the pulp slurry or to the sheet at the size press a polyfunctional amine.

46. The process of claim 45 wherein the polyfunctional amine comprises a monomeric polyamine.

47. The process of claim 46 wherein the monomeric polyamine comprises at least one member selected from the group consisting of $NH_2(CH_2)_nNH_2$, where n is an integer from 2 to 8, and $H_2NCH_2CH_2(NHCH_2CH_2)_nNH_2$, where n is an integer from 1 to 4.

48. The process of claim 47 wherein the monomeric polyamine is selected from the group consisting of ethylenediamine, propylene diamine, tetramethylene diamine, pentamethylene diamine, hexamethylene diamine, diethylene triamine, triethylene tetramine, and tetraethylene pentamine.

49. The process of claim 45 wherein the polyfunctional amine comprises a polymeric polyfunctional amine.

50. The process of claim 49 wherein the polymeric polyfunctional amine is at least one member selected from the group consisting of polyethyleneimine, polyvinylamine, polydiallylamine, poly(vinylamine-co-vinylalcohol) and polyaminoamides prepared by reaction of polyalkyene polyamines with aliphatic dicarboxylic acids.

51. The process of claim 45 wherein the polyfunctional amine is added to the aqueous pulp slurry or to the sheet at the size press at a level of from about 0.5 to about 80 wt. percent based on the dry weight of the polymer.

52. The process of claim 51 wherein the polyfunctional amine is added to the aqueous pulp slurry or to the sheet at the size press at a level of from about 5 to about 15 wt. percent based on the dry weight of the polymer.

53. The process of claim 52 wherein the polyfunctional amine is added to the aqueous pulp slurry or to the sheet at the size press at a level of from about 10 to about 15 wt. percent based on the dry weight of the polymer.

54. The process of claim 45 wherein the polyfunctional amine is added to the sheet at the size press.

55. The process of claim 51 wherein the copolymer is added to the aqueous pulp slurry or to the sheet at the size press at a level of from about 0.1 to about 5 wt. percent based on the dry weight of the pulp.

56. The process of claim 55 wherein the unsaturated comonomer comprises N-vinyl-2-pyrrolidinone at a level of about 45 to 55 mole percent, wherein the polyamine is polyethyleneimine, and wherein the ratio of copolymer to polyethyleneimine is from about 9/1 to about 19/1.

57. The process of claim 34 wherein the copolymer is added to the sheet at the size press.

58. A paper making furnish comprising an aqueous pulp slurry and a N,N-diallyl-3-hydroxy azetidinium halide polymer wherein said paper making furnish contains organic halide by-products comprised of 1,3-dihalo-2-propanol, 2,3-dihalo-1-propanol and 3-halo-1,2-propanediol at a level of less than about 10,000 ppm based on the dry weight of polymer.

59. The paper making furnish of claim 58 wherein the polymer consists essentially of units derived from N,N-diallyl-3-hydroxy azetidinium chloride.

60. The paper making furnish of claim 59 wherein the organic halide by-products comprise 1,3-dichloro-2-propanol, 2,3-dichloro-1-propanol and 3-chloro-1,2-propanediol.

61. The paper making furnish of claim 58 wherein the polymer is a copolymer comprising units derived from at least one unsaturated comonomer comprising at least one member selected from the group consisting of:

(a) $(R)_2C=C(R)_2$ where R, which can be the same or different, is hydrogen, alkyl, phenyl, carboxyl, alkyl carboxylate, hydroxyalkyl carboxylate, acyl, carboxamide, carbalkoxy, dimethylaminoalkyl carboxylate, sulfonate, —HNC($R_1$)O, —CONHC($CH_3$)$CH_2SO_3Na$, pyridinyl and

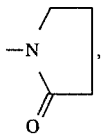

where $R_1$ is hydrogen or $C_1$–$C_{10}$ alkyl;

(b) $R_2N$—$(CH_2CH=CH_2)_2$ where $R_2$, which can be the same or different, is hydrogen or C1–C10 alkyl; and (c) $(R_2)_2^{\oplus}N$—$(CH_2CH=CH_2)_2^{\ominus}X$ where $R_2$, which can be the same or different, is hydrogen or C1–C10 alkyl and X is halogen.

62. The paper making furnish of claim 61 wherein the unsaturated comonomer comprises at least one member selected from the group consisting of acrylamide, diallylamine, diallylamine hydrohalides, methyldiallylamine, methyldiallylamine hydrohalides, dimethyldiallylammonium halides, maleic acid, sodium vinylsulfonate, sodium acrylate, sodium methacrylate, N,N-dimethylaminoethylmethacrylate, dimethylaminoethylacrylate, sodium salt of 2-acrylamido-2-methyl-1-propanesulfonic acid, N-vinyl-2-pyrrolidinone, N-vinylformamide, N-vinylacetamide, vinyl acetate, 2-vinylpyridine, 4-vinylpyridine, 4-styrenesulfonic acid, hydroxyethyl methacrylate, hydroxypropyl methacrylate, hydroxyethyl acrylate, hydroxypropyl acrylate, glycidyl acrylate and glycidyl methacrylate.

63. The paper making furnish of claim 61 wherein the unsaturated comonomer comprises N-vinyl-2-pyrrolidinone.

64. The paper making furnish of claim 58 further comprising a polyfunctional amine selected from the group consisting of monomeric polyfunctional amines and polymeric polyfunctional amines.

65. The paper making furnish of claim 64 wherein the monomeric amine comprises at least one member selected from the group consisting of $NH_2(CH_2)_nNH_2$, where n is an integer from 2 to 8, and $H_2NCH_2CH_2(NHCH_2CH_2)_nNH_2$, where n is an integer from 1 to 4, and the polymeric polyfunctional amine is at least one member selected from the group consisting of polyethyleneimine, polyvinylamine, polydiallylamine, poly(vinylamine-co-vinylalcohol) and polyaminoamides prepared by reaction of polyalkyene polyamines with aliphatic dicarboxylic acids.

66. The paper making furnish of claim 64 wherein the polyfunctional amine is present in the aqueous pulp slurry at a level of from about 0.5 to about 80 wt. percent based on the dry weight of the polymer.

67. The paper making furnish of claim 66 wherein the copolymer is present in the aqueous pulp slurry at a level of from about 0.1 to about 5 wt. percent based on the dry weight of the pulp.

68. The paper making furnish of claim 67 wherein the unsaturated comonomer comprises N-vinyl-2-pyrrolidinone and the polyfunctional amine comprises polyethyleneimine.

69. Paper made by the process of claim 1.

70. Paper made by the process of claim 34.

* * * * *

UNITED STATES PATENT AND TRADEMARK OFFICE
CERTIFICATE OF CORRECTION

PATENT NO. : 5,510,004
DATED : April 23, 1996
INVENTOR(S) : Anthony J. Allen

It is certified that error appears in the above-indentified patent and that said Letters Patent is hereby corrected as shown below:

Column 14, line 36 replace "polyalkyene" with --polyalkylene--.

Column 16, line 45 replace "polyalkyene" with --polyalkylene--.

Column 18, line 28 replace "polyalkyene" with --polyalkylene--.

Signed and Sealed this

Fourteenth Day of January, 1997

Attest:

BRUCE LEHMAN

Attesting Officer

Commissioner of Patents and Trademarks